United States Patent [19]

Shimooku

[11] Patent Number: 5,680,488
[45] Date of Patent: Oct. 21, 1997

[54] OUTPUTTING METHOD AND APPARATUS COMPATIBLE WITH DIFFERING RESOLUTIONS

[75] Inventor: Takashi Shimooku, Yokohama, Japan

[73] Assignee: Canon Kabushiki Kaisha, Tokyo, Japan

[21] Appl. No.: 321,469

[22] Filed: Oct. 11, 1994

Related U.S. Application Data

[63] Continuation of Ser. No. 974,341, Nov. 10, 1992, abandoned, which is a continuation of Ser. No. 685,642, Apr. 16, 1991, abandoned.

Foreign Application Priority Data

Apr. 19, 1990 [JP] Japan ................. 2-101663

[51] Int. Cl.$^6$ ................................................. G06K 9/42
[52] U.S. Cl. ................................................. 382/298
[58] Field of Search .......................... 395/102, 110, 395/128, 150, 151, 109, 116, 163; 345/127, 129, 130, 132; 358/451, 298; 382/276, 298

[56] References Cited

U.S. PATENT DOCUMENTS

| | | | |
|---|---|---|---|
| Re. 33,316 | 8/1990 | Katsuta et al. | 395/128 |
| 4,254,462 | 3/1981 | Davis et al. | 395/163 |
| 4,374,625 | 2/1983 | Hanft et al. | 364/900 |
| 4,476,542 | 10/1984 | Crean et al. | 364/900 |
| 4,621,340 | 11/1986 | Pokorny et al. | 364/900 |
| 4,712,102 | 12/1987 | Troupes et al. | 340/728 |
| 4,742,553 | 5/1988 | Irwin | 382/47 |
| 4,785,391 | 11/1988 | Apley et al. | 395/128 |
| 4,881,069 | 11/1989 | Kameda et al. | 382/47 |
| 4,907,282 | 3/1990 | Daly et al. | 340/731 |
| 4,979,229 | 12/1990 | Moolenaar | 382/47 |
| 5,001,653 | 3/1991 | Buchanan et al. | 395/116 |
| 5,028,908 | 7/1991 | Harrison et al. | 395/150 |
| 5,029,228 | 7/1991 | Nonoyama et al. | 382/47 |
| 5,042,075 | 8/1991 | Sato | 340/731 |
| 5,050,228 | 9/1991 | Yoshida et al. | 340/731 |
| 5,093,903 | 3/1992 | Sudoh et al. | 395/110 |
| 5,097,426 | 3/1992 | Kawamura et al. | 395/110 |
| 5,142,613 | 8/1992 | Morikawa et al. | 395/110 |
| 5,148,517 | 9/1992 | Suzuki et al. | 395/110 |
| 5,168,292 | 12/1992 | Kadowaki et al. | 395/109 |

FOREIGN PATENT DOCUMENTS

| | | | |
|---|---|---|---|
| 0215664 | 3/1987 | European Pat. Off. | G09G 1/16 |
| 0356224 | 2/1990 | European Pat. Off. | B41B 19/00 |
| 0357383 | 3/1990 | European Pat. Off. | G06K 15/02 |

*Primary Examiner*—Jose L. Couso
*Attorney, Agent, or Firm*—Fitzpatrick, Cella, Harper & Scinto

[57] ABSTRACT

An outputting apparatus as a printer comprises: a memory to store a bit map pattern to be produced on the basis of outline font data together with resolution information; and circuitry for comparing a resolution of a cached character and a resolution of a current by referring to the resolution information stored in the memory and for newly executing a cache process by the current resolution in the case where the resolution of the cached character differs from the current resolution. A decrease in print speed due to the change of the output resolution can be prevented.

18 Claims, 2 Drawing Sheets

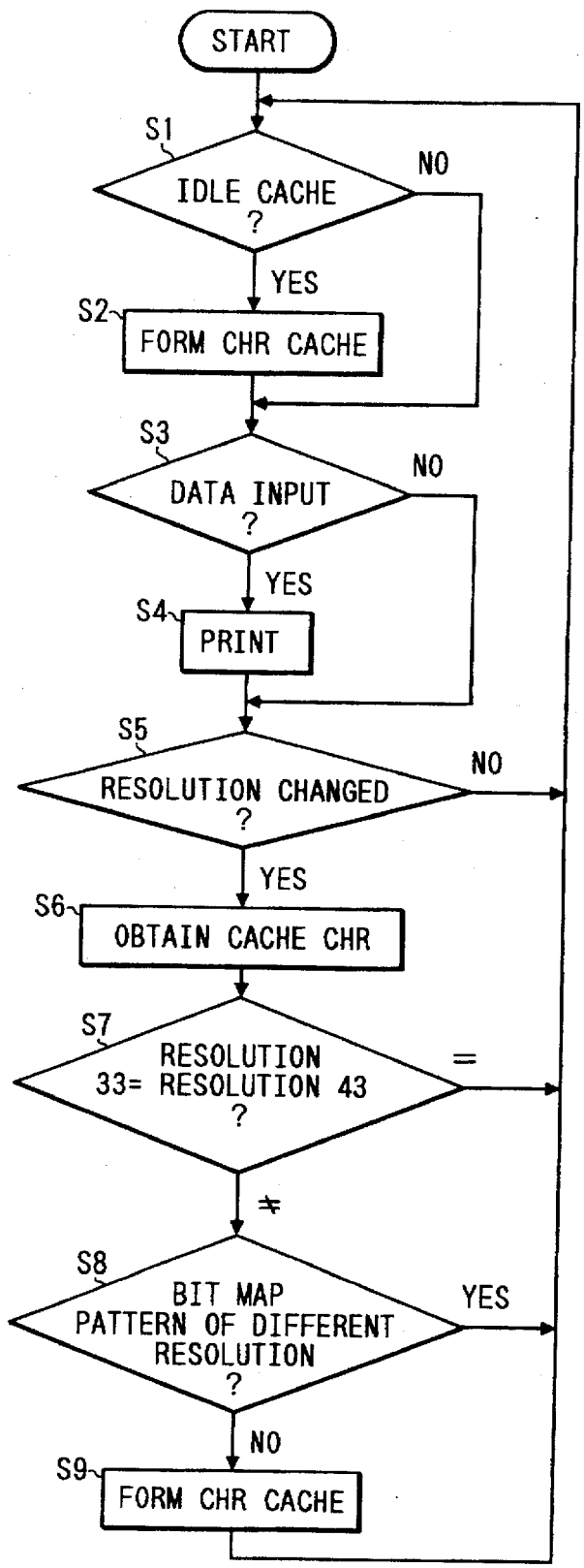

OUTPUTTING METHOD AND APPARATUS COMPATIBLE WITH DIFFERING RESOLUTIONS

This application is a continuation of application Ser. No. 07/974,341 filed Nov. 10, 1992, now abandoned, which is a continuation of application Ser. No. 07/685,642 filed Apr. 16, 1991, abandoned.

BACKGROUND OF THE INVENTION

1. Field of the Invention

The present invention relates to outputting method and apparatus in which an output resolution can be changed and data is generated by using scalable fonts.

2. Related Background Art

Hitherto, in a printer which can change an output resolution and prints data by using outline fonts, a cache process of a character of a type style which has previously been designated by the user is executed upon idling and cache process of a character to be printed is performed upon printing.

However, in the above conventional printer, in the case where a character of the same size as that of the character which has been cached before an output resolution is changed is printed after the resolution was changed, a size of character differs from a size of character before the change of the resolution in a bit map, so that a new cache must be formed in the print control.

Therefore, when the output resolution is changed, the operation to develop an outline font in the bit map is needed when a character is printed, so that there is a drawback such that the print speed becomes slow by a time corresponding to such a developing operation.

SUMMARY OF THE INVENTION

In consideration of the above drawbacks, it is an object of the invention to provide an outputting apparatus in a printer which has a font cache memory for storing a pattern to be cached on the basis of an outline font whose output resolution can be changed together with resolution information and which can change the output resolution, wherein the font cache memory has forming means for storing the pattern to be cached on the basis of the outline font together with the resolution information, for comparing a resolution of the cached character and a current resolution by referring to the resolution information of the font cache memory upon idling of the apparatus, and for forming a new outline font cache by the current resolution in the case where the resolution of the cached character differs from the current resolution.

In consideration of the above drawbacks, another object of the invention is to provide outputting method and apparatus in which since the resolution upon formation of a cache has been stored in the font cache, even if the output resolution was changed, the resolution upon caching of the character to be output upon idling after the change of the output resolution is compared with the current resolution, and if they differ, a new cache can be formed by the current resolution, and a decrease in print speed after the change of the resolution can be prevented.

In consideration of the above drawbacks, still another object of the invention is to provide an outputting apparatus comprising: memory means for storing a bit map pattern to be produced on the basis of outline font data together with resolution information; and means for comparing a resolution of the cached character and a current resolution by referring to the resolution information stored in the memory means and for newly executing a cache process by the current resolution in the case where the resolution of the cached character differs from the current resolution.

In consideration of the above drawbacks, another object of the invention is to provide an outputting method whereby a bit map pattern is formed together with resolution information on the basis of outline font data and whether a bit map pattern is newly produced or not can be determined in accordance with the resolution information to be output.

BRIEF DESCRIPTION OF THE DRAWINGS

FIG. 3 is a flowchart showing a control procedure of the embodiment.

DETAILED DESCRIPTION OF THE PREFERRED EMBODIMENT

An embodiment according to the invention will be described in detail hereinbelow with reference to the drawings.

Figure 1:
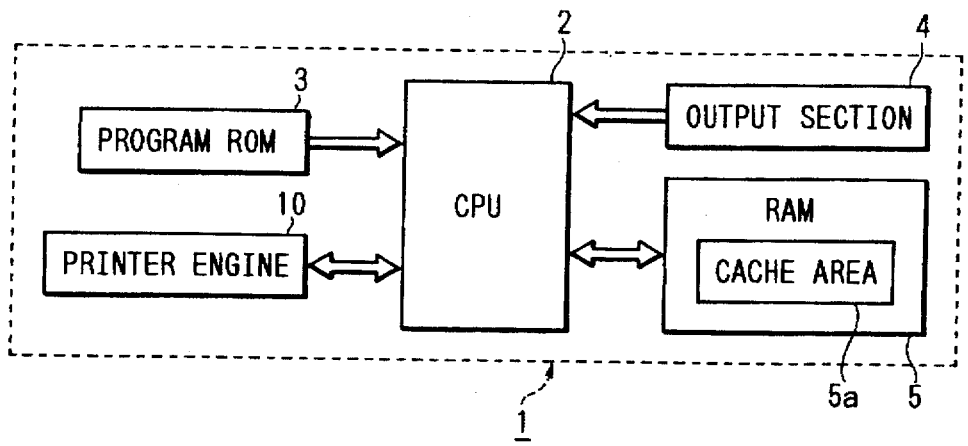
FIG. 1 is a whole block diagram of a printer showing an embodiment according to the invention.

FIG. 1 is a block diagram of an embodiment according to the invention. In the diagram, reference numeral 1 denotes a printer main body. In the printer main body 1, reference numeral 2 denotes a CPU for controlling the whole apparatus of the embodiment in accordance with a control procedure which has been stored in a program ROM 3 and is shown in, for instance, FIG. 3, which will be explained hereinlater, or the like. Reference numeral 3 denotes the program ROM in which the above program and the like have been stored, and 4 indicates an output section which can change an output resolution to an arbitrary resolution. The output section 4 is associated with a well-known printer engine section such as paper feed conveying mechanism of a recording paper, print outputting mechanism for printing on the recording paper with a desired resolution, and the like.

Reference numeral 5 denotes an RAM to store print data or the like. The RAM 5 is also used as a work area when the CPU 2 executes the program. A character cache area 5a is provided in the RAM 5.

Figure 2:
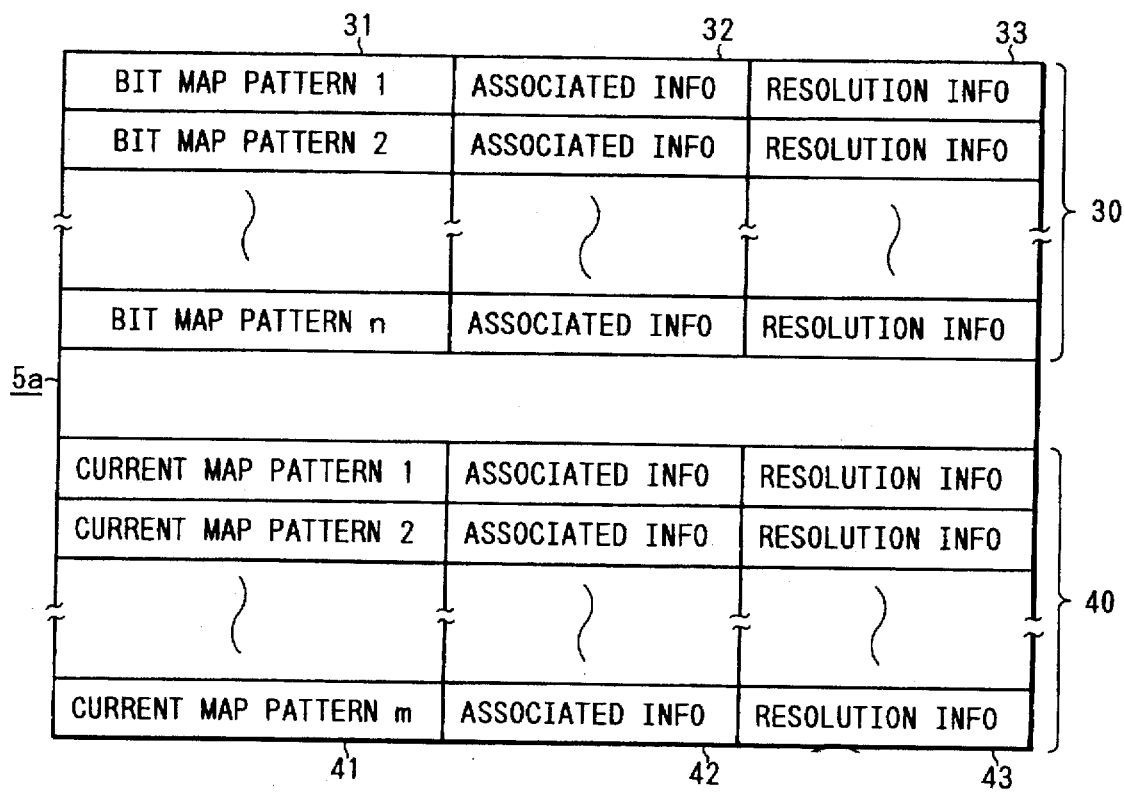
FIG. 2 is a detailed constructional diagram of a cache area shown in FIG. 1.

FIG. 2 shows an example of a construction of the cache area 5a in the RAM 5.

In FIG. 2, reference numeral 30 denotes a memory area to store a bit map font pattern which has been developed by a predetermined resolution on the basis of outline font data; 31 a bit map pattern of a developed character; 32 information associated with the character of the developed bit map pattern 31; 33 resolution information indicative of a resolution of the developed bit map pattern 31; 40 a bit map pattern memory area of a current to be printed and generated; 41 a current map pattern which has been developed; 42 information associated with the developed current map pattern 41; 43 resolution information indicative of a resolution of the developed current map pattern 41. In the embodiment, as shown in the diagram, the resolution information of the developed bit map pattern has been stored in a corresponding manner.

The printing operation of the embodiment with the above construction will now be described hereinbelow with reference to a flowchart of FIG. 3.

When a power source is supplied to the apparatus of the embodiment, the CPU 2 first advances to a process in step S1 and checks to see if it is necessary to perform an idle cache process or not. If there is no need to carry out the idle cache process because the idle cache process has already been executed or the like, step S3 follows.

If it is necessary to perform the idle cache process in the case of the initialization or the like, the processing routine advances to step S2 from step S1 and the idle cache process is executed. In this step, the bit map pattern of a character, the information associated with the character, and the resolution information are stored into the memory area 30 in the cache area 5a in the RAM 5 in correspondence to each other. After the idle cache was formed and the outline font pattern was registered, step S3 follows.

In step S3, a check is made to see if there is a data input or not. If there is no data input, step S5 follows. If there is a data input, step S4 follows. If data has been input during the execution of the idle cache process in step S2, the idle cache process is interrupted and the processing routine similarly advances to step S4. In step S4, the CPU 2 performs the caching of the character which is executed upon printing and controls the output section 4 so as to print and output the input data. Upon caching of the character which is performed at the time of the printing as well, a numerical value 43 indicative of a resolution of the current is stored into the bit map pattern memory area 40 of the current to be printed and generated in the cache area 5a of the RAM 5 in correspondence to the current map pattern 41 of each character. The data is printed by sequentially controlling the output section 4 in accordance with the well-known printing means. Then, step S5 follows.

In step S5, a check is made to see if the resolution has been changed to the output resolution to be printed and generated or not. If the resolution is not switched and a change or the like of the output resolution is not executed, the processing routine is returned to step S1 and the apparatus waits for the reception of next data or the like.

If the output resolution has been switched and a change in output resolution has been instructed, the processing routine advances from step S5 to step S6. In step S6, the cache area 5a of the RAM 5 is searched and the resolution 33 of the character stored in the memory area 30 which has been cached so far is compared with the resolution 43 of the current stored in the bit map pattern memory area 40 of the current to be printed and generated. In step S7, a check is made to see if there is a bit map pattern whose resolution differs as a result of the comparison or not. If the resolution coincides, the processing routine is returned to step S1 and the apparatus waits for the search of a next pattern or the like.

If the resolution differs as a result of the comparison, this resolution is referred to as a bit map pattern P and the processing routine advances from step S7 to step S8 and a check is made to see if a bit map pattern of a character or the like having the same size as that of the bit map pattern P at the current resolution has already been cached in the memory area 30 or not. If the bit map pattern of the character or the like of the size corresponding to the current resolution has already been cached in the memory area 30, the processing routine is returned to step S1.

On the contrary, if NO in step S8, the processing routine advances from step S8 to step S9 and the bit map pattern of the character of the same size as that of the bit map pattern P is newly cached into the memory area 30 at the current resolution. At this time, the associated information 32 and resolution information 33 are also stored in a corresponding manner.

By the procedure described above, even if the bit map pattern of the character or the like of the same size as the size before the resolution is not switched is not cached into the memory area 30 by the resolution after completion of the switching, a cache of the bit pattern of the character of the same size as that before the switching of the resolution can be formed by the resolution after completion of the switching upon idling in a state in which the print output control is not executed. Therefore, in the case of executing the actual printing operation, the bit map pattern of the character or the like of the same size as that before switching has already been cached in the memory area 30 by the resolution after the switching. Even if the resolution is switched, the print speed is not decreased by the cache. An efficient printer can be provided.

As described above, according to the embodiment, although the cache area 5a has been assigned into the RAM 5 as a volatile memory, the invention is not limited to such an example. It is possible to assign such a memory area to an external memory device as a non-volatile memory such as flexible disk device, hard disk device, optical disk device, or the like and to hold outline font or the like into the external memory device, thereby enabling the number of developing times of the outline font character to be further reduced.

As described above, according to the invention, even if the resolution was switched, a cache can be formed at the resolution after the switching in an idling state in which the print output control is not performed. Even if the resolution was switched, the print speed is not reduced by the cache. An efficient printer can be provided.

I claim:

1. An outputting apparatus comprising:
   output means for outputting a dot pattern at one of a plurality of output resolutions;
   memory means for storing a plurality of dot patterns cached on the basis of scalable font data, each of the dot patterns comprising a predetermined number of dots and a size, said memory means also storing for each of the dot patterns information on an assumed resolution at which the dot pattern was assumed, at the time of a caching operation, to be output;
   means for searching the stored plurality of dot patterns for a dot pattern having a desired scale at a current output resolution; and
   generating means for generating a new dot pattern to be stored corresponding to the current output resolution in said memory means when said searching means finds no dot pattern having the desired scale at the current output resolution.

2. An apparatus according to claim 1, wherein when no such dot pattern having the desired scale at the current output resolution is found by said searching means, the new dot pattern having a desired size is generated by said generating means at the current resolution and stored in said memory means as cache data having the current resolution as its assumed resolution.

3. An apparatus according to claim 1, wherein the scalable font data comprises outline font data.

4. An apparatus according to claim 1, wherein a caching operation is again executed during a time when said apparatus does not output a dot pattern.

5. A control apparatus for an outputting apparatus capable of outputting a dot pattern at one of a plurality of output resolutions, said control apparatus comprising:
   memory means for storing a plurality of dot patterns cached on the basis of scalable font data, each of the dot patterns comprising a predetermined number of dots and a size, said memory means also storing for each of the dot patterns information on an assumed resolution at which the dot pattern was assumed, at the time of a caching operation, to be output;

means for searching the stored plurality of dot patterns for a dot pattern having a desired scale at a current output resolution; and generating means for generating a new dot pattern to be stored corresponding to the current output resolution in said memory means when said searching means finds no dot pattern having the desired scale at the current output resolution.

6. A control apparatus according to claim 5, wherein when no such dot pattern having the desired scale at the current output resolution is found by said searching means, the new dot pattern having a desired size is generated by said generating means at the current resolution and stored in said memory means as cache data having the current resolution as its assumed resolution.

7. A control apparatus according to claim 5, wherein the scalable font data comprises outline font data.

8. An outputting method comprising the computer-implemented steps of:

outputting with outputting means a dot pattern at one of a plurality of output resolutions;

storing in storing means a plurality of dot patterns cached on the basis of scalable font data, each of the dot patterns comprising a predetermined number of dots and a size, and also storing for each of the dot patterns information on an assumed resolution at which the dot pattern was assumed, at the time of a caching operation, to be output;

searching with searching means the stored plurality of dot patterns for a dot pattern having a desired scale at a current output resolution; and generating with generating means a new dot pattern to be stored corresponding to the current output resolution in the storing means when no dot pattern having the desired scale at the current output resolution is found in said searching step.

9. A method according to claim 8, wherein when no such dot pattern having the desired scale at the current output resolution is found in said searching step, the new dot pattern having a desired size at the current resolution is generated in said generating step and stored as cache data having the current resolution as its assumed resolution.

10. A method according to claim 8, wherein the scalable font data comprises outline font data.

11. A method according to claim 8, further comprising the step of again executing a caching operation during a time when a dot pattern is not output.

12. A control method for an outputting apparatus capable of outputting a dot pattern at one of a plurality of output resolutions, said control method comprising the computer-implemented steps of:

storing in storing means a plurality of dot patterns cached on the basis of scalable font data, each of the dot patterns comprising a predetermined number of dots and a size, and also storing for each of the dot patterns information on an assumed resolution at which the dot pattern was assumed, at the time of a caching operation, to be output;

searching with searching means the stored plurality of dot patterns for a dot pattern having a desired scale at a current output resolution; and generating with generating means a new dot pattern to be stored corresponding to the current output resolution in the storing means when no dot pattern having the desired scale at the current output resolution is found in said searching step.

13. A control method according to claim 12, wherein when no such dot pattern having the desired scale at the current output resolution is found in said searching step, the new dot pattern having a desired size at the current resolution is generated in said generating step and stored as cache data having the current resolution as its assumed resolution.

14. A control method according to claim 12, wherein the scalable font data comprises outline font data.

15. An apparatus according to claim 1, wherein when new data is inputted, the caching operation is interrupted.

16. An apparatus according to claim 5, wherein when new data is inputted, the caching operation is interrupted.

17. A method according to claim 8, further comprising the step of interrupting the caching operation when new data is inputted.

18. A method according to claim 12, further comprising the step of interrupting the caching operation when new data is inputted.

* * * * *

UNITED STATES PATENT AND TRADEMARK OFFICE
CERTIFICATE OF CORRECTION

PATENT NO. : 5,680,488
DATED : October 21, 1997
INVENTOR(S) : Takashi SHIMOOKU

It is certified that error appears in the above-identified patent and that said Letters Patent is hereby corrected as shown below:

ON THE COVER PAGE:

AT [56] References Cited - U.S. PATENT DOCUMENTS

"4,254,462    3/1981    Davis et al."

should read

--4,254,467    3/1981    Davis et al.--; and

"5,028,908    7/1991    Harrison et al."

should read

--5,208,908    5/1993    Harrison et al.--.

Signed and Sealed this

Twenty-sixth Day of May, 1998

*Attest:*

BRUCE LEHMAN

*Attesting Officer*  *Commissioner of Patents and Trademarks*